Aug. 16, 1949.    J. HEIKKINEN    2,479,113
STEERING TRAILER HITCH
Filed Nov. 14, 1947
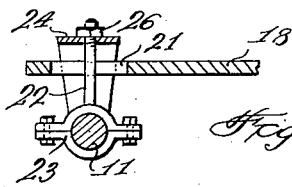
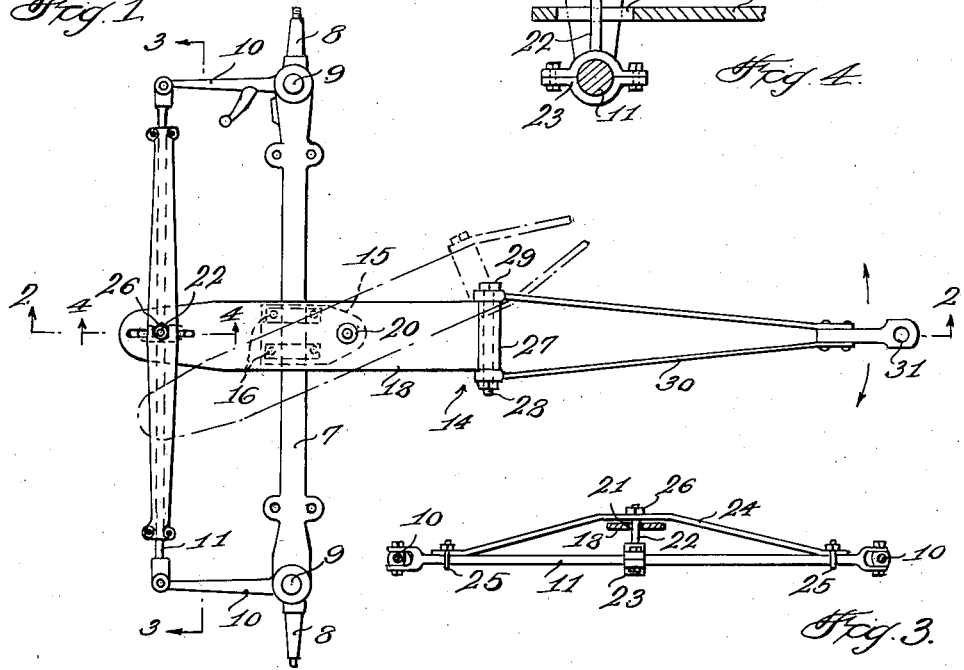
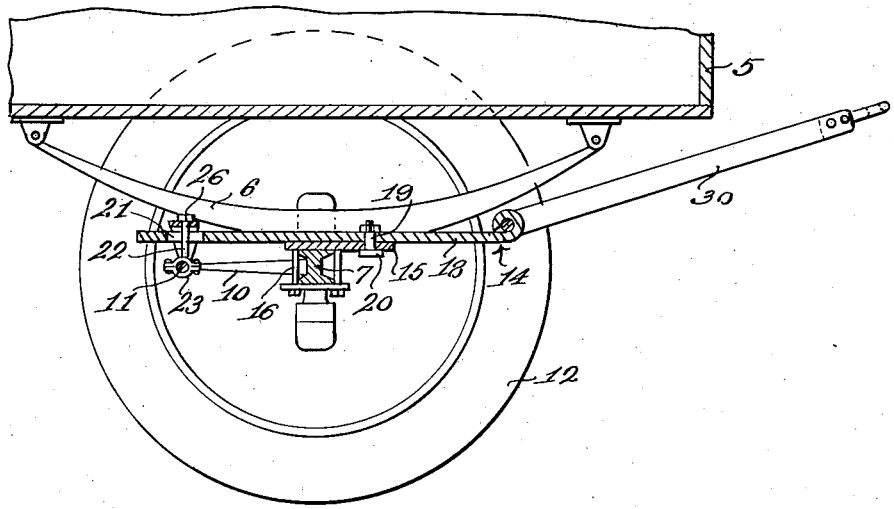
Inventor
John Heikkinen
By Randolph & Beavers
Attorneys Patented Aug. 16, 1949

2,479,113

UNITED STATES PATENT OFFICE 2,479,113

STEERING TRAILER HITCH

John Heikkinen, Mohawk, Mich., assignor of thirty per cent to Charles Heikkinen, Mohawk, Mich.

Application November 14, 1947, Serial No. 786,094

1 Claim. (Cl. 280—33.55)

1

This invention relates to an improved construction of steering trailer hitch especially adapted for use with trailers provided with four or more ground wheels including the front steering wheels and is especially applicable to trailers utilizing an automobile chassis or similar structure employing a connecting or steering rod for causing the turning movement of the front wheels of the trailer as a unit.

More particularly, it is a primary object of the present invention to provide a trailer hitch of extremely simple construction capable of being readily connected to a trailer chassis whereby the pulling force from a draft vehicle will be exerted on the front axle of the trailer and by means of which any turning movement of the draft vehicle will be imparted to the steering wheels of the trailer through the trailer hitch to the connecting rod for causing the trailer to steer with a maximum of ease and readily follow the path of a draft vehicle and which will likewise greatly facilitate backing movement of a trailer, coupled to a draft vehicle.

Another object of the invention is to provide a trailer hitch which is extremely durable yet which may be economically manufactured and sold and readily applied to or removed from a trailer vehicle and which is applicable for attachment to substantially any draft vehicle.

Various other objects and advantages of the invention will hereinafter become more fully apparent from the following description of the drawing, illustrating a preferred embodiment thereof, and wherein:

Figure 1 is a top plan view of the steering trailer hitch shown attached to a portion of the chassis of a trailer;

Figure 2 is a longitudinal sectional view thereof taken substantially along a plane as indicated by the line 2—2 of Figure 1 and illustrating a portion of the trailer body;

Figure 3 is a cross sectional view taken substantially along a plane as indicated by the line 3—3 of Figure 1, and Figure 4 is an enlarged longitudinal sectional view taken substantially along a plane as indicated by the line 4—4 of Figure 1.

Referring more specifically to the drawing, the numeral 5 designates a portion of the forward end of a trailer body which is supported by a conventional spring suspension means 6 above the front axle 7 which constitutes a part of the trailer chassis and which has a stub axle 8 pivotally connected by a king bolt 9 to each end thereof and projecting therefrom. A steering

2 knuckle 10 which is fixed to or formed integral with each stub axle 8 extends rearwardly from adjacent each end of the axle 7 and the rear, free ends of the steering knuckles 10 are pivotally connected to the ends of a connecting or steering rod 11 for causing the stub axles 8 to swing as a unit relatively to the front axle 7. A front steering wheel 12 is journaled on each of the stub axles 8 in a conventional manner. The parts previously described are all of conventional construction and the parts 7 to 11, inclusive, may constitute a conventional automobile front chassis structure.

The steering trailer hitch comprising the invention and designated generally 14 includes a plate 15 which is detachably secured to the upper side of the intermediate portion of the axle 7 by clamp fastenings 16 and which has a portion projecting forwardly therefrom and provided with an opening 17. An elongated bar or plate 18 is disposed with its intermediate portion on the plate 15 and extends transversely across the axle 7 with the rear end thereof extending over the connecting rod 11 and with its forward end extending substantially forwardly of the plate 15. The plate or bar 18 is provided with an opening 19 which registers with the opening 17 and said aligned openings are adapted to receive the shank of a nut and bolt or other pivot fastening 20 by means of which said plate 18 is pivotally connected to the plate 15 for swinging movement thereon.

The plate 18 is provided with an elongated, longitudinally extending opening or slot 21 which is disposed over the connecting rod 11 for loosely receiving a bolt or threaded pin 22 which projects upwardly from a clamp 23 which is detachably secured to the intermediate portion of the connecting rod 11 and which, as best seen in Figure 4, is composed of corresponding upper and lower clamp sections from the intermediate portion of the upper section of which projects said pin or bolt 22. An elongated bar 24 is disposed longitudinally over the connecting rod 11 and is secured at its ends thereto by detachable clamps 25, adjacent the ends of the connecting rod 11. As illustrated in Figure 3, the intermediate portion of the bar 24 is upwardly offset with respect to the ends thereof and is disposed over the bar or plate 18 and has an opening to removably receive the upper threaded end of the bolt or pin 22 which is retained in engagement therewith by a nut 26 which engages said bolt 22, above the bar 24.

The forward end of the bar or plate 18 is rolled to provide a transversely extending barrel portion 27 for receiving the shank of a nut and bolt fastening 28 which extends therethrough and which also extends turnably through eyes 29 forming the rear end of a forwardly extending tongue or drawbar 30 which is thereby pivotally connected to the forward end of the plate 18 for vertical swinging movement and which is provided with a suitable eye 31 at its forward end adapted to detachably engage any suitable coupling unit, not shown, connected to a draft vehicle, not shown.

Assuming that the drawbar or tongue 30 is connected to a draft vehicle, it will be readily apparent that said drawbar may swing vertically relatively to the plate 18 to accommodate relative vertical movement of the draft and trailer vehicles as in passing over an uneven road surface. It will likewise be readily apparent that when the draft vehicle executes a turn that the tongue 30 will swing horizontally with the plate 18 relatively to the trailer axle 7 on the pivot 20 and said plate 18 in so moving will cause the connecting rod 11 to move in the same direction as the rear end of the plate 18 swings by engagement of the pin or bolt 22 therewith and the opening 21 will allow for sliding movement of the bolt 22 relatively to the plate 18 as the connecting rod moves transversely of the trailer while the plate 18 is swinging relatively thereto. The bar 24 likewise moves with the connecting rod 11 and functions as a guard to maintain the plate 18 in engagement with the pin 22. The movement of the connecting rod 11 is transmitted to the wheels 12 through the steering knuckles 10 and stub axles 11 for causing the front wheels to turn or swing in the same direction as the plate 18 and tongue 30 so that the trailer will readily follow in the path of its draft vehicle.

Various modifications and changes are contemplated and may obviously be resorted to, without departing from the spirit or scope of the invention as hereinafter defined by the appended claim.

I claim as my invention:

A steering trailer hitch comprising a base plate adapted to be detachably secured to the front axle of a trailer vehicle and having a portion extending forwardly therefrom, an elongated bar or plate disposed on said base plate and pivotally connected thereto at a point remote to the ends thereof and forwardly of the axle for swinging movement in a horizontal plane, said bar or plate having a portion adapted to be disposed over a connecting rod of the trailer vehicle and rearwardly of said axle, said portion being provided with an elongated, longitudinally disposed slot or opening, a clamp detachably and adjustably secured to the connecting rod and having an upwardly projecting pin extending loosely through said slot or opening whereby said connecting rod will be moved transversely of the trailer vehicle when said bar or plate is swung on its pivot, a tongue or draw-bar pivotally connected for vertical swinging movement to the forward end of said plate or bar and extending forwardly therefrom, and an elongated guard member having end portions detachably secured to the connecting rod and having an upwardly offset intermediate portion disposed over the slotted portion of said bar or plate and detachably connected to said pin for retaining the plate in engagement with the pin.

JOHN HEIKKINEN.

REFERENCES CITED

The following references are of record in the file of this patent:

UNITED STATES PATENTS

| Number | Name | Date |
|---|---|---|
| 1,221,608 | Schroder | Apr. 3, 1917 |
| 1,367,166 | Snyder et al. | Feb. 1, 1921 |